United States Patent [19]

Zimmerman

[11] Patent Number: 4,483,908

[45] Date of Patent: Nov. 20, 1984

[54] INTUMESCENT MATERIAL-COATED GALVANIC CELLS

[75] Inventor: Herman M. Zimmerman, Lakewood, Ohio

[73] Assignee: Union Carbide Corporation, Danbury, Conn.

[21] Appl. No.: 537,565

[22] Filed: Sep. 30, 1983

[51] Int. Cl.³ .......................................... H01M 14/00
[52] U.S. Cl. ................................... 429/8; 429/53; 429/105; 429/149; 429/196
[58] Field of Search ............... 429/8, 100, 105, 196, 429/53, 176, 175, 149

[56] References Cited

U.S. PATENT DOCUMENTS

| | | | |
|---|---|---|---|
| 3,497,396 | 2/1970 | Goodwin | 429/53 |
| 4,048,389 | 9/1977 | Bubnick et al. | 429/105 X |
| 4,104,073 | 8/1978 | Koide et al. | 106/15 |
| 4,137,376 | 1/1979 | Clegg et al. | 429/104 |
| 4,184,007 | 1/1980 | Urry | 429/8 |
| 4,266,039 | 5/1981 | Hons-Olivier et al. | 521/85 |
| 4,273,821 | 6/1981 | Pedlow | 428/215 |

OTHER PUBLICATIONS

H. L. Vandersall, *Intumescent Coating Systems, Their Development and Chemistry*, J. Fire and Flammability, vol. 2 (Apr. 1971), pp. 97–140.

RIC-53 TM Sales Brochure, *Intumescent Fire Resistant Coating*.

*Primary Examiner*—Charles F. LeFevour
*Attorney, Agent, or Firm*—William E. Dickheiser

[57] ABSTRACT

A galvanic cell characterized in that at least a portion of the exterior of the cell's housing is encased within an intumescent material.

10 Claims, 3 Drawing Figures

INTUMESCENT MATERIAL-COATED GALVANIC CELLS

FIELD OF THE INVENTION

This invention relates to galvanic cells wherein at least a portion of the exterior of the cell housing is encased within an intumescent material.

BACKGROUND OF THE INVENTION

When suddenly subjected to high temperature sources, such as flames, galvanic cells of some types may disassemble possibly causing damage to person and property. This possibility of cell disassembly is particularly present in high energy systems such as lithium cells, particularly those employing oxyhalides as cathode/electrolytes wherein the lithium anode is disposed adjacent the cell housing.

One approach to preventing cell disassembly due to external heating would be to surround the cells with a thick layer of insulating material. In some cases this may be an acceptable approach: but for most applications, such as in miniaturized electronic devices, the small battery compartment provided precludes use of bulky cell insulation. What is required is a means for protecting the cells from heat without greatly increasing the bulk of the cells. This is particularly true during shipment of the cells as once the cell has been inserted into a device the device itself will provide some degree of thermal insulation.

Another approach which may be adapted is to provide cells with a safety venting means, such as that shown in U.S. Pat. No. 4,329,405 issued on May 11, 1982. Such venting means rely typically on pressure caused, for example, by the heating of the electrolyte to force open the safety venting means. These venting means will normally provide adequate security against cell disassembly. However, it is believed with regard to certain cell systems that should the anode melt before the electrolyte becomes hot enough for its vapor pressure to reach the venting pressure necessary to operate the cell's venting means a chemical reaction may occur causing the cell to disassemble. Consequently, it would be desirable to ensure that cells provided with such a safety vent could safely vent without disassembly even if subjected to sudden high temperatures.

It is therefore an object of this invention to provide a galvanic cell having an insulating means such that said cell will possess a reduced propensity to disassemble when subjected to sudden elevated temperature, which cell occupies substantially the same volume and contains an equal amount of active materials as conventional galvanic cells.

It is another object of this invention to provide a galvanic cell having a safety venting means and having an insulating means such that when said cell is subjected to sudden high heat the insulating means will enhance the ability of the safety venting means to operate thereby reducing the chance of cell disassembly.

It is a further object of this invention to provide a galvanic cell comprising a lithium anode and an oyhalide cathode/electrolyte, a safety venting means and an insulating means such that when said cell is subjected to sudden high heat the insulating means will delay the melting of the lithium anode until the cathode/electrolyte has boiled, forced open the safety venting means and escaped from the cell, thereby preventing the lithium from chemically reacting with the oxyhalide thus avoiding potential disassembly of the cell.

The foregoing and additional objects will become fully apparent from the following description and the accompanying drawings.

SUMMARY OF THE INVENTION

This invention relates to a galvanic cell comprising a cell housing characterized in that a layer of an intumescent material is disposed about at least a portion of the exterior of the cell housing.

In another aspect, this invention relates to a battery comprised of a housing containing a plurality of galvanic cells, characterized in that at least a portion of the battery's housing is encased within an intumescent material.

Intumescent compositions are materials which, when heated above their critical temperature, will bubble and swell, thereby forming a thick non-flammable multicellular insulative barrier, up to 200 or more times their original thickness. When applied as intumescent coatings they can provide the protective, serviceable and aesthetic properties of non fire-retardant coatings or layers without occupying any additional initial volume. Intumescent coatings are discussed in detail in *Intumescent Coating Systems, Their Development and Chemistry*, H. L. Vandersall, J. Fire & Flammability, Vol. 2 (April 1971) pages 97–140, the content of which article is herein incorporated by reference.

Although the majority of commercially available intumescent coatings provide a substantially carbonaceous foam, it is within the scope of this invention to employ inorganic foaming mixtures, e.g. phosphate/borate mixtures. The intumescent materials which may be employed in the practice of this invention should swell to at least about 10 times their original thickness when heated above their critical temperature. Most preferably, this critical temperature is at or slightly below the temperature required for the chemical reaction to occur which may lead to the disassembly of a cell employing a given a galvanic electrochemical system. For cells employing lithium anodes it is therefore most preferable that the intumescent material selected have a critical temperature of from about 175° C. to about 180° C., the melting point of lithium being 179° C. In addition, the intumescent materials which may be employed in the practice of this invention should possess after swelling a sufficient insulative ability such that they will prevent or substantially delay the normally expected effects of high heat on the cell.

The layer of intumescent material may be applied to the exterior of the cell's housing in any of the forms in which intumescent compositions are generally known in the fireproofing trade. Illustrative of such intumescent materials are paint-like coatings (such as RIC-53, manufactured by Rockwell International Corp.) as well as intumescent tapes (Such as those described in U.S. Pat. No. 4,273,871) and intumescent elastic packing materials (such as those described in U.S. Pat. No. 4,266,039) which patents are herein incorporated by reference. Forms of intumescent coating which are adherent to the exterior of the cell housing are preferred.

It is preferable that as much as possible of the exterior of the cell housing be coated with a layer of intumescent material, as it cannot be predicted which outer portion of the cell will be subjected to sudden high heat. However, at least terminal portions of the cell housing should remain uncoated such that the cell can make proper electrical contact within the device in which such cell is employed.

The present invention reduces the possibility of cell disassembly by providing an effective layer of insulation upon contact with high temperature sources. In cell constructions wherein a safety venting means is not provided this insulative layer will at least delay melting of the anode, thus providing time for removing the cell from the heat source. In cell constructions wherein a safety venting means is provided, by slowing the rate of cell heating this layer of insulation may further give the electrolyte time to boil, thereby providing a vapor pressure buildup sufficient to force open such safety venting means. This will permit the electrolyte to escape from the cell as gas prior to the melting of the anode thereby avoiding disassembly of the cell. Moreover, in still other circumstances, in cells with or without a safety venting means, the insulative layer will prevent the anode from melting, thereby preventing cell disassembly in this instance as well.

The cells of this invention may employ a broad range of anode/cathode combinations, but the intumescent coating is most useful on high energy cells employing active metal anodes and nonaqueous electrolytes. Illustrate of such active metal anodes are lithium, sodium, calcium, potassium and aluminum. The use of an intumescent coating is particularly preferable in cells having an anode composed of lithium and liquid cathode/electrolytes. A cell construction which is particularly appropriate for this invention is the split internal cathode collector/outer anode construction as described in U.S. Pat. No. 4,048,389. In this case, it is particularly preferred that the exterior portion of the cell housing corresponding with the inner portion which is in physical contact with the anode be coated with intumescent material.

Although not wishing to be held to any theory, applicant hypothesizes that cells of this type (particularly those cells employing a lithium anode and oxyhalide cathode/electolyte such as thionyl chloride, sulfuryl chloride, thionyl bromide and the like) disassemble as a result of the chemical reaction which occurs when the anode melts and reacts with the electrolyte. If the cell electrolyte can boil off and escape, e.g. though a safety vent, this reaction is prevented and disassembly is avoided. However, if the cell is subjected to a sudden high heat such that the anode melts before the electrolyte can escape, disassembly may occur.

Suitable nonaqueous liquid cathode materials for use in cells of this invention could be one or more of the liquid oxyhalides of an element of Group V or Group VI of the Periodic Table and/or one or more of the halides of an element of Group IV to Group VI of the Periodic Table, said Periodic Table being the Periodic Table of Elements as set forth on the inside back cover of the Handbook of Chemistry and Physics, 48th Edition, The Chemical Rubber Co., Cleveland, Ohio 1967–1968. For example, such nonaqueous cathode materials would include sulfuryl chloride, thionyl chloride phosphorous oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride. Another suitable cathode material would be liquid sulfur dioxide.

Anodes suitable for use in nonaqueous liquid cathode cell systems can be generally metals and include the alkali metals, alkaline earth metals and alloys of alkali metals or alkaline earth metals with each other and other metals. The term "alloy" as used herein is intended to include mixtures: solid solutions such as lithium-magnesium: and intermetallic compounds such as lithium monoaluminide. The preferred anode materials are the alkali metals and particularly lithium, sodium and postassium. When using a lithium anode the anode may be coated with a vinyl resin as disclosed in U.S. Pat. No. 3,993,501, said patent being incorporated herein by reference.

The cathode collector for use in liquid cathode cell systems has to be electronically conductive so as to permit external electrical contact to be made with the active cathode material and also to provide extended area reaction sites for the cathodic electrochemical process of the cell. Materials suitable for use as a cathode collector are carbon materials and metals such as nickel, with acetylene black being preferable. In addition, the cathode collector when made of a particulate material should be capable of being molded directly within a can or capable of being molded into various size discrete bodies that can be handled without cracking or breaking. To impart a cohesive characteristic to some types of cathode collectors, such as carbonaceous cathode collectors, a suitable binder material, with or without plasticizers and with or without stabilizers, can be added to the cathode collector materials. Suitable binder materials for this purpose may include vinyl polymers, polyethylene, polypropylene, polyacrylics, polystyrene and the like. For example, polytetrafluoroethylene would be the preferred binder for cathode collectors for use with liquid oxyhalide cathodes. The binder, if required, should be added in an amount between about 5% and about 30% by weight of the molded cathode collector since an amount less than 5% would not provide sufficient strength to the molded body while an amount larger than 30% would wetproof the surface of the carbon and/or reduce the available surface of the carbon, thereby reducing the activation site areas required for the cathodic electrochemical process of the cell. Preferably, the binder should be between 10% and 25% by weight of the cathode collector. Of importance in selecting the materials for the cathode collector is to select materials that will be chemically stable in the cell system in which they are to be used.

A solute for use in liquid cathode cell systems may be a simple or double salt which will produce an ionically conductive solution when dissolved in a suitable solvent. Preferred solutes for nonaqueous systems are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act a acids or acceptors of electron doublets. The basic concept is set forth in the chemical literature (Journal of the Franklin Institute, Vol. 226, July/-December, 1938, pages 293-313 by G. N. /Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in conjunction with liquid oxyhalide cathodes include aluminum fluoride, aluminum bromide, aluminum chloride, antimony pentachloride, zirconium tetrachloride, phosphorus pentachloride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

If desired, and specifically for the halides, a cosolvent should be added to the liquid active reducible cathode and solute solution to alter the dielectric constant, viscosity or solvent properties of the solution to achieve better conductivity. Some examples of suitable cosolvent are nitrobenzene, tetrahydrofuran 1.3-dioxolane, 3-methyl-2-oxyazolidone, propylene carbonate, gamma-butyrolactone, sulfolane, ethylene glycol sulfite, dimethyl sulfite, benzoyl chloride, dimethoxyethane, dimethyl isoxazole, diethyl carbonate , sulfur dioxide and the like.

Suitable separators for use with liquid cathodes in nonaqueous cells suitable for use in nonaqueous liquid cathode cell systems are the nonwoven glass separators, preferable those separators that incorporate long glass fibers along with the short glass fibers since such a combination increases the tear strength of the separators thereby making them easier to handle.

The container of the cell could be made of stainless steel, iron, nickel, plastic-coated metals or some other suitable material. Some preferred combinations of nonaqueous cathode materials and anodes would be as follows:

1. sulfuryl chloride/Li or Na;
2. thionyl chloride/Li or Na;
3. phosphorous oxychloride/Li or Na;
4. sulfur monochloride/Li or Na;
5. sulfur monobromide/Li or Na;
6. selenium tetrachloride/Li or Na;

Cells for use in this invention would include liquid oxyhalide cells using sulfuryl chloride, thionyl chloride or mixtures thereof with a lithium anode.

It is to be understood that intumescent materials could be placed on at least a portion of the cell housing in cells employing other electrochemical systems such as, for example, Leclanche dry cells, zinc chloride cells, lithium-$MnO_2$ cells, lithium-iron sulfide cells, alkaline-$MnO_2$ cells, nickel-cadmium cells, and lead-acid cells.

BRIEF DESCRIPTION OF THE DRAWINGS

The present invention will become more apparent from the following description thereof when considered together with the accompanying drawing which is set forth as being exemplary of an embodiment of the present invention and is not intended in any way to be limitative thereof and wherein.

DESCRIPTION OF THE PREFERRED EMBODIMENT

Figure 1:
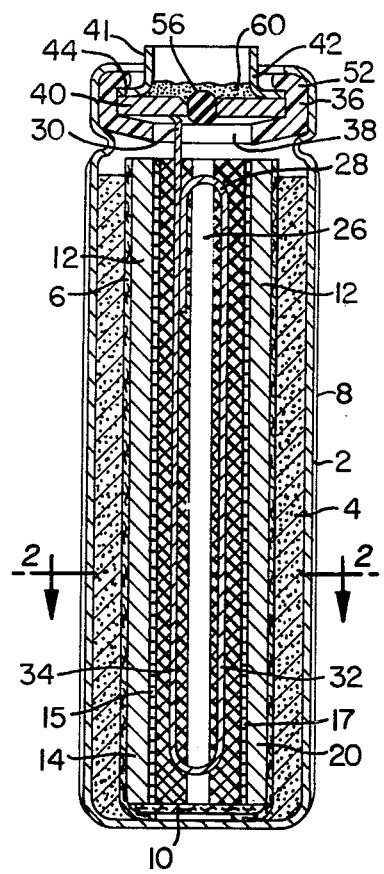
FIG. 1 is a vertical cross-sectional view of an electrochemical cell having a thin layer of intumescent material placed about the outside of the cell container.

Referring in detail to FIG. 1, there is shown a cross-sectional view of a cylindrical cell having a thin layer of intumescent material, said cell having a housing comprising cylindrical container 2 having disposed therein an anode 4 in contact with the inner upstanding circumference of the container 2 thereby adapting the container as the anodic or negative terminal for the cell. Disposed within and in contact with the inner circumference of anode 4 is a separator liner 6 with its bottom separator or disc 10. If desired, the anode material could be extruded within the container 2, rolled with the container material or composed of one or more segments to form a cylindrical tube and then placed in the can.

Figure 2:
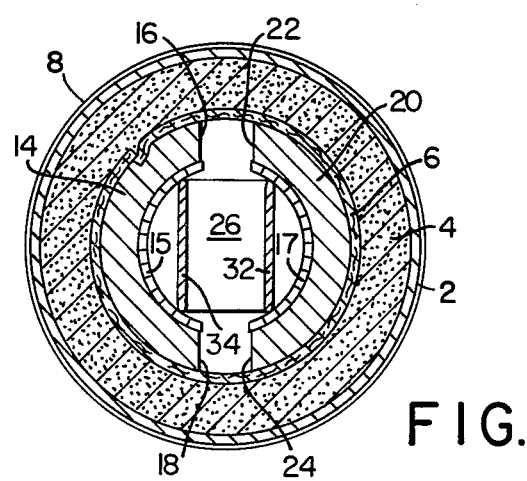
FIG. 2 is an enlarged horizontal cross sectional view taken along line 2—2 of FIG. 1.

A two member cathode collector 12 is shown in FIGS. 1 and 2 comprising a first half cylindrical annular member 14 having flat end faces 16 and 18 and a second half cylindrical annular member 20 having flat end faces 22 and 24. When the flat end faces of each cylindrical half member are arranged in an opposing fashion as shown in FIGS. 1 and 2, an axial cavity 26 is defined between the cylindrical half annular members 14 and 20. If desired, arcuate type backing sheets 15 and 17, such as inert electrically conductive metal screens or grids, could be disposed against the inner surface wall of the cathode collector bodies 14 and 20. This will result in a substantially uniform spring pressure over the inner wall surface of cathode collector 12.

An electrically conductive spring strip 28 is appropriately bent into a flattened elliptically shaped member having an extending end 30. When inserting the spring strip 28 into a container, the legs 32, 34 of the conductive strip 28 are squeezed together and forced into the axial opening between the two screen backed cathode collector members arranged in a container as shown in FIGS. 1 and 2. The inserted conductive spring strip 28 resiliently biases the two cathode collector members 14 and 20 via backing screens 15 and 17 so as to provide a substantially uniform and continuous pressure over the inner wall of the cathode collector members. The extended end 30 of spring strip 28 is shown projected above the surface of anode members 14 and 20. An insulating gasket 36 has a central opening 38 through which the projected end 30 of the spring strip 28 passes, whereupon the end 30 is then welded to a cover 40 thereby adapting the cover 40 as the cathodic or positive terminal of the cell.

Secured to the cover 40 is a cylindrical cap 42. Specifically, the cylindrical cap comprises a cylindrical segment 41 terminating at one end with an outwardly oriented flange 44 which is secured to cover 40.

The insulating gasket 36 has a peripheral depending skirt 52 disposed between the cover 40 and the upper inner wall of the container 2 for closing the cell through conventional crimping techniques. As shown in FIG. 1, the cylindrical cap is secured to the cover 40 and the cell is closed using conventional crimping techniques with all of the solid components of the cell assembled within the container 2. After the cell is assembled with the solid components, a hypodermic needle or the like is used to inject the liquid component into the assembled cell. Specifically, a cathode-electrolyte comprising a suitable salt dissolved in a liquid oxyhalide, a liquid halide with a cosolvent or mixtures thereof can be dispensed through a cover vent orifice into cavity 26 using a hypodermic needle whereupon it can penetrate through the cell.

Once the cell's liquid component has been fed into the container, a polytetrafluoroethylene deformable ball 56 is inserted into said cover vent orifice. A layer of sealant 60 is disposed over ball 56 and cover 40 within cylindrical member 42 producing a fully sealed cell.

Disposed about the periphery of the upstanding wall of cell container 2 is a layer of intumescent material 8. Although shown here in a paint or lacquer form, such intumescent material may be applied by the use of a putty, tape, or other means well known to one skilled in the art. A decorative finish or thin label (not shown) may be affixed surrounding the intumescent layer.

Figure 3:
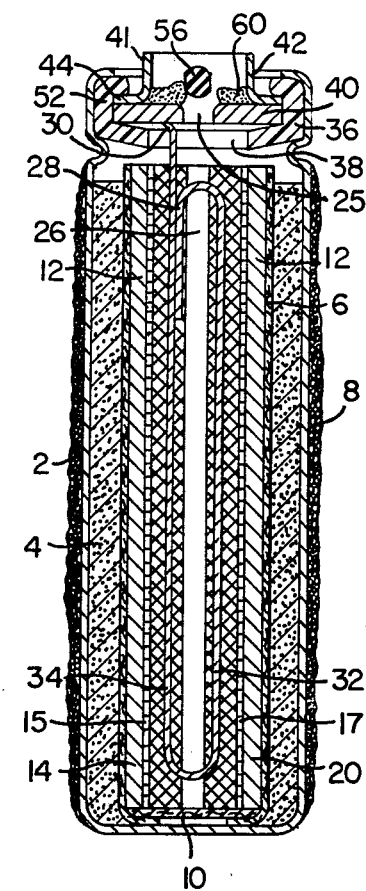
FIG. 3 is a vertical cross-sectional view of the cell of FIG. 1 after said cell has been subjected to a high temperature sufficient to activate and swell the intumescent layer.

FIG. 3 shows the cell of FIG. 1 after such cell has been exposed to high heat. It is seen that intumescent layer 8 has foamed, thereby allowing the cathode/electrolyte to reach a / sufficient temperature to eject the deformable ball /from orifice 25, thereby safely venting the cell before melting of the anode 4 and potential disassembly of the cell.

What is claimed is:

1. A galvanic cell comprised of a cell housing characterized in that an unexpanded layer of a heat-activatable intumescent material is disposed about at least a portion of the exterior of said cell housing.

2. The galvanic cell of claim 1 wherein said cell further comprises a nonaqueous electrolyte.

3. The electrochemical cell of claim 2 wherein the cell container additionally houses a cathode collector, and wherein the cathode material is a liquid cathode/electrolyte.

4. The galvanic cell of claim 3 wherein the cathode/electrolyte is an oxyhalide selected from the group consisting of thionyl chloride, sulfuryl chloride, phosphorous oxychloride, thionyl bromide, chromyl chloride, vanadyl tribromide and selenium oxychloride.

5. The galvanic cell of claim 4 wherein the anode is selected from the group consisting of lithium, sodium, calcium, potassium and aluminum.

6. The galvanic cell of claim 5 wherein the anode is disposed adjacent the inner side of the cell housing.

7. The glavanic cell of claim 6 wherein said cell further comprises a safety venting means.

8. The galvanic cell of claim 7 wherein the anode is comprised of lithium and wherein the cathode/electrolyte is comprised of at least one member of the group consisting of thionyl chloride, sulfuryl chloride and thionyl bromide.

9. The galvanic cell of claim 8 wherein said intumescent material has a critical temperature of between about 175° C. and about 180° C.

10. A battery comprised of a housing containing a plurality of galvanic cells, characterized in that at least a portion of the battery's housing has disposed thereon an unexpanded layer of heat-activatable intumescent material.

* * * * *